United States Patent
Armbruster et al.

(10) Patent No.: US 12,325,355 B2
(45) Date of Patent: Jun. 10, 2025

(54) MOTOR VEHICLE AND METHOD FOR GUIDING SUCH A MOTOR VEHICLE

(71) Applicant: AUDI AG, Ingolstadt (DE)

(72) Inventors: Tilman Armbruster, Ingolstadt (DE);
Stefanie Köppe, Potsdam (DE);
Johannes Reim, Eichstätt (DE);
Valentin Schmidt, Neuburg a.d. Donau (DE); Michael Augustin, Schrobenhausen (DE); Marcel Debelec, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/533,489

(22) Filed: Dec. 8, 2023

(65) Prior Publication Data
US 2024/0190337 A1    Jun. 13, 2024

(30) Foreign Application Priority Data
Dec. 8, 2022    (DE) ...................... 10 2022 132 655.1

(51) Int. Cl.
*B60Q 1/50*    (2006.01)
(52) U.S. Cl.
CPC .......... *B60Q 1/525* (2013.01); *B60Q 2400/50* (2013.01)
(58) Field of Classification Search
CPC ...................... B60Q 1/525; B60Q 2400/50
See application file for complete search history.

(56) References Cited

U.S. PATENT DOCUMENTS

| | | | |
|---|---|---|---|
| 8,325,027 B2 * | 12/2012 | Tee | B62J 6/01 353/11 |
| 8,676,431 B1 * | 3/2014 | Mariet | G08G 1/0962 701/28 |
| 9,992,461 B1 * | 6/2018 | Schreiber | G01C 21/3602 |
| 9,992,465 B1 * | 6/2018 | Schreiber | H04N 9/3194 |
| 10,124,847 B2 * | 11/2018 | Pearce | B62J 6/22 |

(Continued)

FOREIGN PATENT DOCUMENTS

| | | |
|---|---|---|
| DE | 102011018382 A1 | 10/2012 |
| DE | 102014226254 A1 | 6/2016 |

(Continued)

*Primary Examiner* — Hoi C Lau
(74) *Attorney, Agent, or Firm* — Sterne, Kessler, Goldstein & Fox P.L.L.C.

(57) ABSTRACT

The present disclosure relate to a motor vehicle comprising a sensor device for detecting the position and the distance from an object located in front of the motor vehicle and a device for projecting a light marker onto the ground in the region of the object, wherein the device is configured, on the basis of the detected position and distance data, to project either a round or polygonal light marker on a region around the object, wherein this is dimensioned is such a way that its border is indicates a minimum distance to be maintained around the object when driving past, and/or the device is configured to generate a linear light marker and project it on the ground into the region in front of the motor vehicle running by the object in such a way that the distance of the light marker corresponds to the minimum distance to be maintained from the object when driving past and indicates when the motor vehicle can reenter the lane after passing the object while maintaining a safe distance.

15 Claims, 3 Drawing Sheets

(56) References Cited

U.S. PATENT DOCUMENTS

| | | | |
|---|---|---|---|
| 10,843,622 B2* | 11/2020 | Lee | G05D 1/0246 |
| 11,235,805 B2* | 2/2022 | Tran | B60Q 1/547 |
| 11,267,396 B2* | 3/2022 | Dellock | B60Q 1/247 |
| 12,067,881 B1* | 8/2024 | Khmelev | H04W 4/40 |
| 2014/0267415 A1* | 9/2014 | Tang | G06T 11/60 |
| | | | 345/633 |
| 2016/0023703 A1* | 1/2016 | Braggin | B62J 6/26 |
| | | | 362/473 |
| 2018/0056854 A1* | 3/2018 | Kunii | H04N 9/3194 |
| 2018/0079463 A1* | 3/2018 | Pearce | B62J 45/412 |
| 2018/0093607 A1* | 4/2018 | Omanovic | B60Q 1/34 |
| 2018/0118095 A1* | 5/2018 | Kunii | G01C 21/365 |
| 2018/0118099 A1* | 5/2018 | Kunii | B60K 35/10 |
| 2018/0181359 A1* | 6/2018 | Monroe | G06F 3/0488 |
| 2018/0334089 A1* | 11/2018 | Huang | B60Q 5/006 |
| 2019/0061611 A1* | 2/2019 | Dellock | G08G 1/096775 |
| 2020/0058222 A1* | 2/2020 | Miyahara | B60Q 1/525 |
| 2021/0229597 A1* | 7/2021 | Dellock | H05B 47/19 |
| 2022/0114879 A1* | 4/2022 | Larsen | B60Q 1/535 |
| 2022/0306151 A1* | 9/2022 | Fukutaka | B60K 35/22 |
| 2022/0390251 A1* | 12/2022 | Suzuki | B60Q 1/34 |
| 2023/0249614 A1* | 8/2023 | Kim | B60Q 1/535 |
| | | | 340/468 |
| 2024/0034358 A1* | 2/2024 | Grard | B60W 60/0011 |
| 2024/0190337 A1* | 6/2024 | Armbruster | B60Q 1/525 |
| 2024/0270157 A1* | 8/2024 | Yamasaki | B60Q 1/143 |

FOREIGN PATENT DOCUMENTS

| | | |
|---|---|---|
| DE | 102017200781 A1 | 7/2018 |
| DE | 102018212056 A1 | 1/2020 |
| DE | 102020101020 A1 | 7/2021 |

* cited by examiner

MOTOR VEHICLE AND METHOD FOR GUIDING SUCH A MOTOR VEHICLE

TECHNICAL FIELD

The present disclosure relates to a motor vehicle comprising a sensor device for detecting the position and the distance from an object located in front of the motor vehicle, and a device for projecting a light marker onto the ground in the region of the object.

BACKGROUND

Especially at dusk or in the dark, it is sometimes difficult for the person driving the motor vehicle to recognize an object located in a region in front of the motor vehicle such as a bicyclist, a motorcycle or motor scooter rider, a scooter rider or even a pedestrian, which object is to be passed. It is true that the object is illuminated to a certain extent by the dipped headlights or street lighting that is usually switched on in such lighting conditions. However, since this lighting is not selective, the object is therefore not highlighted. A motor vehicle is in fact known from DE 10 2017 200 781 A1 which has a projection device that makes it possible to visually mark the ground region around the object and, furthermore, to project additional information in the form of a text onto the ground. This does improve the perception of the object by the person driving the motor vehicle, and a certain communication with the object can occur. Nevertheless, critical situations can occur when passing despite everything.

BRIEF DESCRIPTION OF DRAWINGS/FIGURES

DETAILED DESCRIPTION

Figure 1:
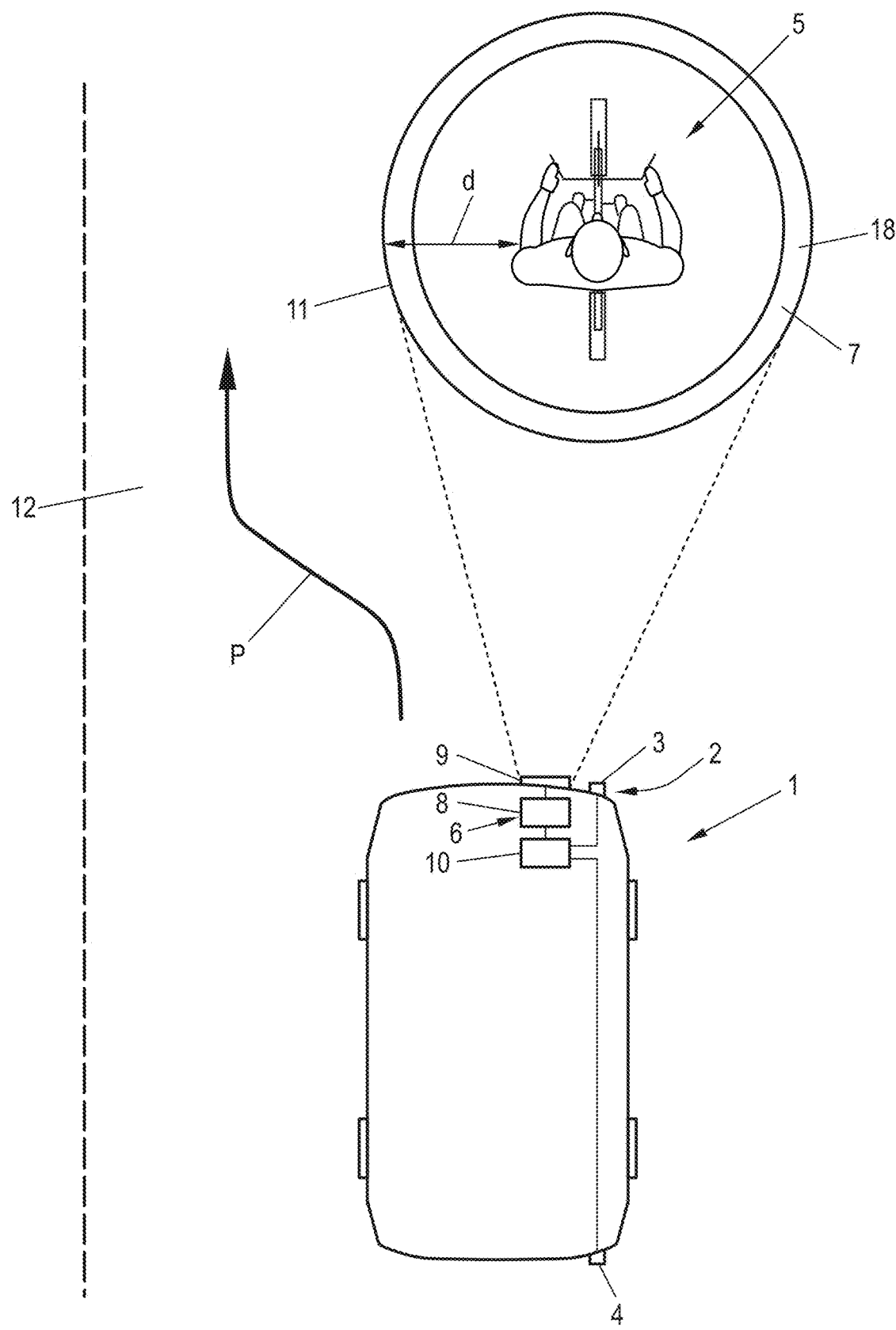
FIG. 1 illustrates a schematic diagram of a motor vehicle in accordance with an exemplary embodiment.

The present disclosure is based on the problem of presenting an improved motor vehicle.

In order to solve this problem in a motor vehicle of the type mentioned at the beginning, it is provided according to the present disclosure that the device is configured, on the basis of the detected position and distance data, to either project a round and polygonal light marker onto a region around the object, wherein this is dimensioned in such a way that its border indicates a minimum distance to be maintained around the object when driving past, and/or the device is configured to generate a linear light marker and project it into the region in front of the motor vehicle running by the object in such a way that the distance of the light marker corresponds to the minimum distance to be maintained from the object when driving past and indicates when the motor vehicle can reenter the lane after passing the object while maintaining a safe distance.

The motor vehicle according to the present disclosure has a corresponding light marker device which is capable of guiding the vehicle driver with a sufficient safe distance around the object while passing. On the one hand, a sensor device is provided via which position and distance data about the object, i.e., for example, the bicyclist, are detected continuously, wherein said data can naturally change continuously due to the movement of one's own vehicle relative to the object. Continuous data detection means that the exact relative position of the object to the motor vehicle and the distance are always known. Based on this position and distance data, a vehicle device for generating a light marker is now able to generate and project this light marker onto the ground in different ways, but always indicating to the driver a possibility for safe passing.

According to an embodiment of the present disclosure, the device can be designed to generate a round or polygonal light marker on the basis of these captured data and project it onto the ground directly around the object. The object is consequently located in the light marker projection. This light marker projection is dimensioned such that the marking edge indicates a usually legally prescribed minimum distance that is to be maintained when driving past. This is for example 1.5 m within city limits and 2 m outside city limits. The person driving the motor vehicle is on the one hand made aware of the object located in front of him early on via this light marker. On the other hand, the person can precisely recognize the distance they must travel at least around the object while passing in order; on the one hand, to maintain the safe distance and accordingly comply with regulations, and, on the other hand, to maintain a high degree of safety in this traffic situation.

In one embodiment of the present disclosure, the device is configured to generate a linear light marker and project into the region in front of the motor vehicle on the ground leading past the object in such a way that the distance of the light marker corresponds to the minimum distance to be maintained when driving past the object and indicates when the motor vehicle can reenter the lane after passing the object. In this embodiment of the present disclosure, the person driving the vehicle is shown an elongated, linear light marker in front of the vehicle which extends from the person's own vehicle along the roadway. This linear light marker is also determined on the basis of the continuously acquired position and distance data. On the basis of these data, the distance and the position of the object are known so that the linear light marker can be determined such that it displays the path of travel laterally leading around the object and at the same time also the minimum distance to be maintained. This means that the linear light marker forms a slightly lane-exiting arc in the region of the object, which the motor vehicle should follow in order to maintain the minimum distance. At the same time, the light marker is also generated and displayed in such a way that the person driving the vehicle can recognize when he can again reenter the lane without risk, i.e., he can therefore change back to the original lane after passing the object in order to also maintain a corresponding safe distance in this case. The position of and distance to the object can be continuously detected also while the vehicle is passing and even afterwards after a sufficient number of sensors correspondingly positioned at the front, side and rear are regularly provided on the vehicle which allow object detection.

Due to the projected light marker, the attention of the person driving the motor vehicle is naturally also directed toward the object in this case, since, due to the corresponding linear guidance around the object, clear information is provided that a corresponding object is located in this region that must be taken into account.

The light marker is thereby continuously adapted due to continuous data acquisition, i.e., it moves with and is correspondingly adapted by the device. Due to the variation of the distance of the motor vehicle to the object and also the variation of the angular position of both relative to one another, the light marker therefore naturally has to be correspondingly adjusted during a corresponding change in position so that the marker ultimately shown on the ground and recognized by the person in the motor vehicle also provides the corresponding informational content.

In this case, it is possible to provide both embodiments of the present disclosure cumulatively, i.e., on the one hand according to one embodiment, to illuminate the ground area directly around the object with a light marker representing the safe distance, and on the other hand to additionally display the linear road marker which more or less indicates the right lane edge of the lane to be ideally traveled so that the driver consequently receives a maximum amount of supporting information.

According to an embodiment of the present disclosure relating to the projection of the round or polygonal projection, the device can be configured to project this round or polygonal light marker in the form of a ring or an angular frame, or in the form of a completely illuminated area. This means that either only one light line or a completely illuminated bright circle or a completely illuminated bright square or the like is projected directly onto the position of the object.

If a ring or a frame is shown, it is conceivable to mark it with multiple light bars which more or less pass through the ring or frame in the manner of an off-limits area. Such an off-limits area display has additional, intuitively detectable informational content since such off-limits area markers are known from road traffic.

If a linear light marker is generated and projected according to another embodiment of the present disclosure, the linear light marker can be a line representing the lateral road boundary. A relatively narrow tracer or a type of lane light is projected onto the road, which for example delimits the right edge of the minimum travel path to be maintained, i.e., indicates the position that the right-hand side of the vehicle should follow in order to safely pass.

Alternatively, it is also conceivable for the linear light marker to be a marker representing the travel path. This light marker is substantially wider; it represents a type of light carpet which is projected in front of the motor vehicle and of course, like the narrow lane light line, represents the corresponding route on the ground. The width of this light carpet is configured, for example, to be similar to the vehicle width.

According to a useful development of the present disclosure, the device can be configured to project at least one additional piece of information in the form of an illuminated display on the ground. Accordingly, the display information is not limited to just the route information to indicate that the safe distance has been maintained and, if applicable, that the vehicle can safely reenter the lane. Rather, it is possible to additionally display more information or more informational content that goes beyond this basic information. Depending on the informational content, this additional information can also be generated and displayed depending on the detected sensor data.

For example, the device may be configured to project warning information which indicates that a prescribed minimum distance cannot be maintained when passing the object. In this case, a warning symbol in the form of a warning triangle or written information is additionally projected onto the ground, for example, with which drivers can orient themselves. It is also conceivable in this context for the device for generating the light marker with the additional informational content to be configured in such a way that the light marker is at least partially projected in a signal color. It is conceivable, for example, to display the light marker in red, or at least partially in red, if this signal color is to indicate that special care is required in a certain region around the object. For example, if a linear light marker is projected and the minimum distance cannot be fully maintained, the portion in which the minimum distance cannot be maintained can be displayed in red light so that the driver can recognize this possible critical region. Even when there is a light marker around the object, the critical region toward the center of the road can be displayed in red light in such a case, while the other region of the light marker is shown, for example, only in bright white light.

To project the light marker regardless of its type and content, a laser or a laser array having several lasers is preferably used by which, on the one hand, the light marker can be projected very precisely, and by which correspondingly different colors can also be displayed if required. Of course, a suitable matrix light comprising a luminous matrix having a plurality of individual LEDs can also be used, which equally selectively allows ground illumination or ground projection. A corresponding control device, which controls the corresponding lighting or projection mode or also undertakes the processing of the sensor data and the like, is of course provided by the device.

In addition to the motor vehicle, the present disclosure also relates to a method for guiding a motor vehicle around an object located in front of the motor vehicle that is to be passed, wherein the motor vehicle has a sensor device for detecting the position of and the distance to an object located in front of the motor vehicle, as well as a device for projecting a light marker onto a ground in the region of the object. This method is characterized in that, based on the detected position and distance data, either a round or polygonal light marker is projected onto a region around the object which is dimensioned such that its border indicates a minimum distance to be maintained around the object when driving past, and/or that a linear light marker is projected into the region in front of the motor vehicle running by the object in such a way that the distance of the light marker corresponds to the minimum distance to be maintained from the object when driving past and indicates when the motor vehicle can reenter the lane after passing the object while maintaining a safe distance.

In this case, the round or polygonal light marker can be projected onto the ground as a ring or frame or as a completely illuminated area, optionally also with multiple light bars in the manner of an off-limits area.

The linear light marker can be a line representing the lateral boundary of the vehicle's own path of travel; alternatively, the linear light marker can also be a relatively wide marker representing the path of travel.

Furthermore, at least one additional piece of information in the form of an illuminated display can be projected onto the ground, for example in the form of warning information which indicates that a prescribed minimum distance cannot be observed when passing the object. In addition, the light marker can be displayed at least partially in a signal color as additional informational content.

FIG. 1 illustrates a motor vehicle 1 according to the present disclosure comprising a sensor device 2 with multiple sensors 3, 4 which are arranged on the front and rear sides by way of example but can of course also be positioned elsewhere. In this case, it can be ultrasonic, radar, lidar or other distance and position sensors or cameras and the like, i.e., all detection devices which enable a distance of the motor vehicle 1 to an object 5, in this case a bicyclist, to be detected, and also the corresponding position of the object 5 relative to the motor vehicle. The sensor device 2 is configured to continuously detect these position and distance data so that any distance and position change is known directly by the vehicle.

Furthermore, a device 6 for projecting a light marker 7 onto ground in front of the motor vehicle 1 is provided. The device 6 comprises, on the one hand, the actual projector 8 with the projection means 9, for example a laser or the like, and a control device 10 controlling operation which is also given the sensor data. The projection device 6 is now able to generate, based on the position and distance data, the corresponding light marker 7 and project it onto the ground so that the light marker 7 surrounds the object 5. In the shown example, a ring 18 is projected as a light marker 7 around the object 5 onto the ground; alternatively it can also be a completely bright circle. In any case, the light marker 7 is generated and projected in such a way that its border 11, at least in the region facing the lane 12, indicates to the passing motor vehicle 1 which, as shown by the arrow P, wishes to pass the object 5, a minimum distance d to be maintained in so doing which corresponds to a safe distance to be maintained here. This safe distance is, for example, 1.5 m within city limits and 2 m outside city limits. Via a corresponding position detection, for example by GPS or the like, of the person's own motor vehicle 1, it is known whether the vehicle is located in the inside or outside city limits. The projection device 6 is now able to determine, supported by this position information of the motor vehicle 1, how large the safe distance must now be in order to then correspondingly generate the light marker 7 so that its border 11 displays the safe distance to be maintained in the region facing the roadway 12. This functionality can be provided for at least one embodiment.

The person driving the motor vehicle 1 can accordingly, on the one hand, detect the object 5 early on since the light marker 7 can be projected from a distance, wherein the distance from which the projection is started can optionally be selected depending on the location (inside city limits/outside city limits) and/or the speed so that at a higher speed, projection already takes place from a further distance than at a lower speed. Due to the projected light marker 7, the object 5 is clearly highlighted during dusk or darkness even if other lighting devices of the motor vehicle, i.e., the usual front headlights, are in operation. In addition, however, the person also receives accurate knowledge about how far he has to leave the lane in order to drive past the object 5 safely and while maintaining the safe distance d.

Figure 2:
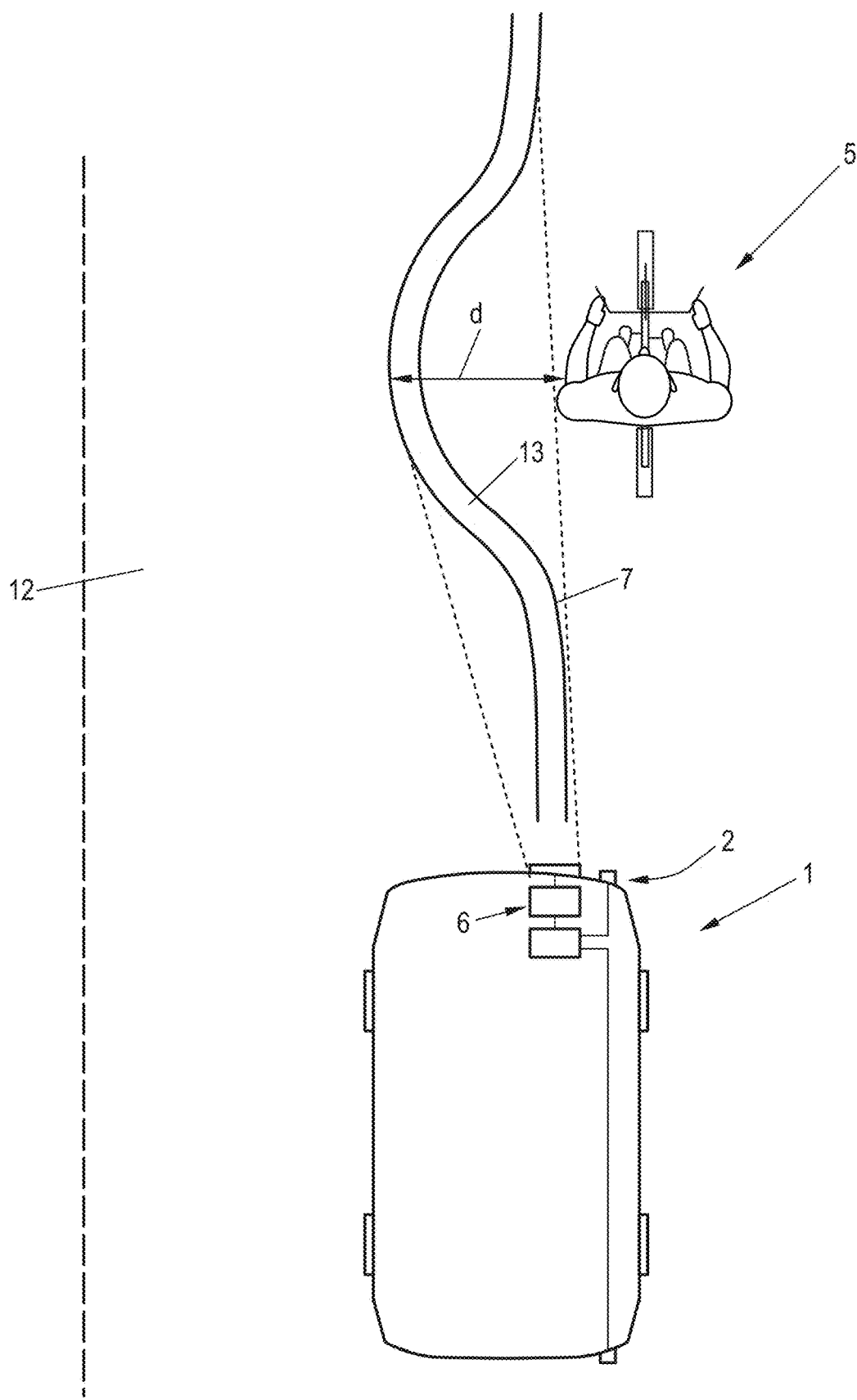
FIG. 2 illustrates a schematic diagram of a light marker display in accordance with an exemplary embodiment.

FIG. 2 illustrates a schematic representation of another embodiment of a corresponding light marker display. In turn, a motor vehicle 1 is provided which corresponds in its design to the motor vehicle 1 of FIG. 1. The sensor device 2 again correspondingly detects an object 5 in front of the vehicle, which is traveling in its own lane 12 and which is to be passed. In this embodiment of the present disclosure, the projection device 6 is designed to generate a light marker 7 in the form of a narrower, elongated line 13 on the basis of the sensor data and to project it onto the ground. As can be seen, this line 13 leads around the object 5 and also leads back to lane 12. In this case, the light marker 7 or the line 13 is also generated and displayed in such a way that it is redisplayed at a safe distance d in the region of driving past the object 5, i.e., the person driving the motor vehicle 1 is again shown how they can drive safely around the object 5 while maintaining the safety distance d.

At the same time, however, the person is also shown when they can safely switch or merge back into the lane 12 again while maintaining an appropriate distance. It can be seen that the light marker 7 or the line 13 runs back to the lane 12. Since the distance and the position of the object 5 is continuously detected even while driving by and even when the motor vehicle 1 is already slightly in front of the object 5, which is possible via the corresponding sensor device 2, it is possible to determine exactly when safely reentering the lane is possible. This can be displayed via the light marker 7.

Figure 3:
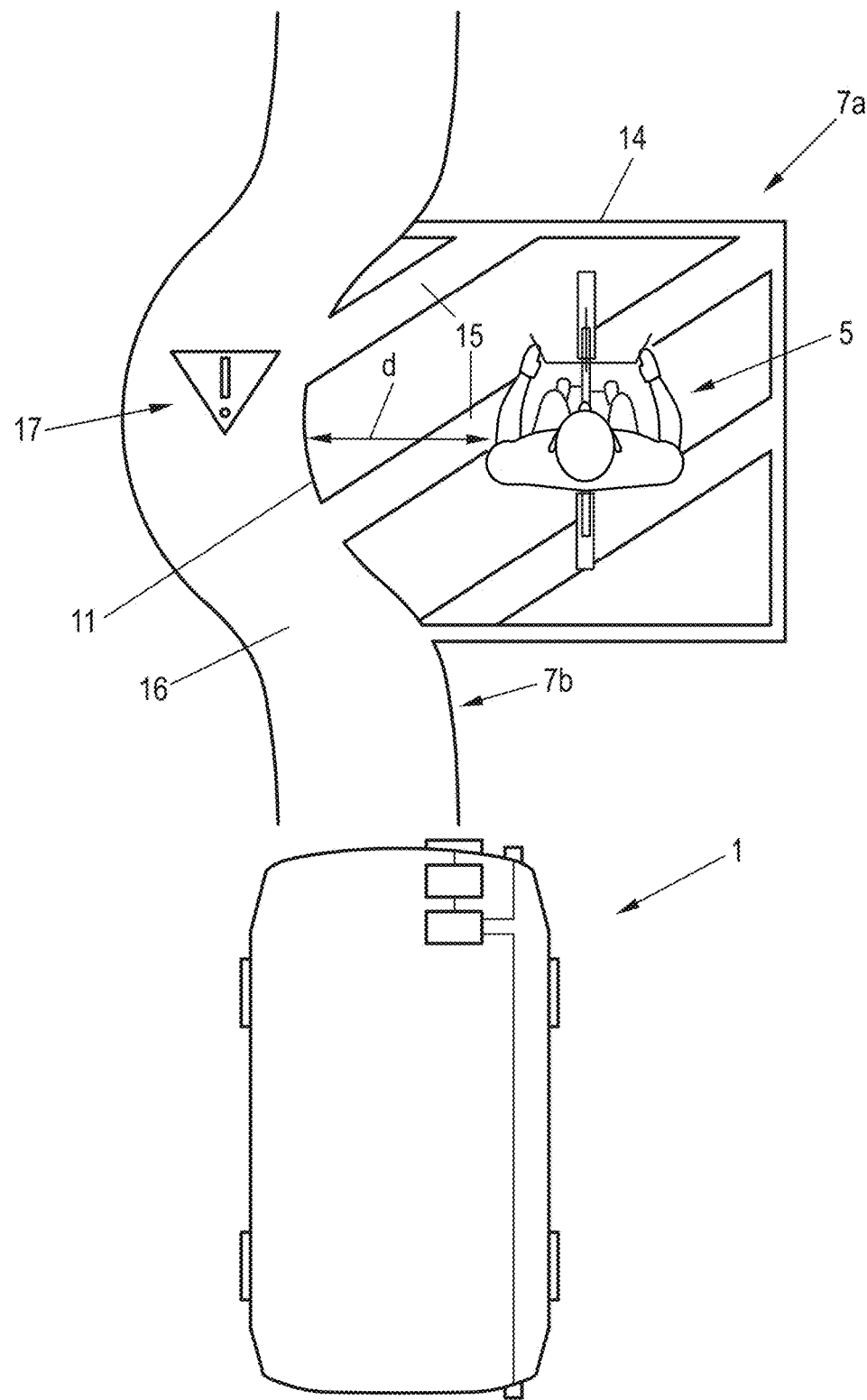
FIG. 3 illustrates a schematic diagram of a light marker variant in accordance with an exemplary embodiment.

Finally, the schematic diagram according to FIG. 3 illustrates another embodiment of a motor vehicle according to the present disclosure and a possible display of the light markers. Two different light markers 7a, 7b are shown here. In turn, the light marker 7a, corresponding to the light marker 7 from FIG. 1, is one which is shown around the object 5. By way of example, it is shown here as a substantially angular or rectangular display which is designed like a frame 14 which is displayed or filled via corresponding light bars 15 like an off-limits area. The border 11 of this light marker 7a toward the center of the roadway in turn corresponds to the minimum distance d to be maintained.

Also shown is second light marker 7b which is similar to that of FIG. 2 and is accordingly also designed as a linear light marker. However, it is not designed here as a narrow line but as a wide light carpet 16 which corresponds to approximately the vehicle width. In the shown example, this light carpet 16 again leads around the object 5 in an arc, wherein the distance of the right light carpet boundary corresponds to the border 11 of the light marker 7a, i.e., again indicating the minimum distance d. It can also be seen here that the light marker 7b leads back in a region in front of the object 5, hence indicating that it is possible to safely reenter the lane.

A combination of both light markers 7a, 7b, i.e., of the variants from FIGS. 1 and 2, is accordingly used here. This combination consequently offers the advantages of both light marker variants. On the one hand, the object 5 can be marked via the light marker 7a, which as noted is shown here as a rectangular off-limits area, but also as a round off-limits area or as a completely illuminated bright circle. This enables accurate, attentive detection of the object 5. Again, the minimum distance d is displayed by the border 11. This also applies to the second light marker 7b, i.e., the light carpet 16. This also indicates the safe distance d with its right-hand brightness limit, just as the entire light carpet 16 also indicates both the ideal, safe travel path and the safe return to the lane.

After the two light markers 7a, 7b merge into each other in the region to the side of the object 5, the possibility exists of displaying the minimum distance d there to be maintained or the corresponding border in a different color of light, for example red, therefore projecting the border 11 of the light marker 7a or the right edge of the light marker 7b in striking red in this region.

FIG. 3 furthermore illustrates the possibility of projecting additional informational content 17, here in the form of a warning sign, onto the ground. In the shown example, this informational content 17 or this warning symbol is inserted in the area of the light carpet 16 and is displayed in a bright red color, for example. Additional information for the person driving the motor vehicle 1 is provided that care is to be taken in this region still to be driven since that is where the actual driving past the object 5 occurs. Of course, it is possible to also display this additional informational content elsewhere; it is only important that it is perceived by the person in a timely manner.

This additional informational content can also be in different ways, for example in text form or the like, or as already described above, in the form of the red border of the light markers 7a, 7b in the region of the safe distance d to be maintained.

The projection device 6 has, for example, one or more lasers via which the corresponding light markers 7, 7a, 7b and optionally additional informational content 17 can be projected onto the ground. Alternatively, corresponding matrix light sources having a plurality of separately controllable LEDs and the like are also conceivable.

For all shown examples, which are in no way limiting, it holds that, due to the continuous position and distance data detection, the continuously varying relative positions of the motor vehicle 1 and the object 5 to one another are of course detected. This makes it possible to continuously adapt the light marker 7 or the light marker 7a, 7b to the given situation because of course the display changes the closer the motor vehicle 1 comes to the object 5 or when it starts to leave the lane, etc. Continuous tracking is therefore provided.

The invention claimed is:

1. A motor vehicle comprising:
   a sensor device configured to detect a position of and a distance from an object located in front of the motor vehicle; and
   a projection device configured to project, based on the position and the distance, a light marker onto a ground near the object, the light marker being round, polygonal, and/or linear,
      wherein, if the light marker is round or polygonal, the light marker is projected to indicate a minimum distance to be maintained around the object when driving past, and
      wherein, if the light marker is linear, the light marker is projected to correspond to a minimum distance to be maintained from the object when driving past, the light marker indicating where the motor vehicle can safely reenter a driving lane after passing the object.

2. The motor vehicle according to claim 1, wherein the light marker is round or polygonal, the light marker being a ring, a frame, or a completely illuminated area.

3. The motor vehicle according to claim 2, wherein the light marker is round or polygonal, the light marker being a ring or a frame, and the light marker indicates an off-limits area.

4. The motor vehicle according to claim 1, wherein the light marker is linear, the light marker being a line that represents a lateral road boundary.

5. The motor vehicle according to claim 1, wherein the light marker is linear, the light marker being a line that represents a path of travel.

6. The motor vehicle according to claim 1, wherein the projection device is further configured to project at least one additional piece of information, the at least one additional piece of information being an illuminated display on the ground.

7. The motor vehicle according to claim 6, wherein the illuminated display is configured to project warning information, the warning information indicating that a prescribed minimum distance cannot be observed when passing the object.

8. The motor vehicle according to claim 7, wherein the projection device is further configured to project at least partially the at least one additional piece of information in a signal color.

9. A method for guiding a motor vehicle, the method comprising:
   detecting, with a sensor device, a position relative to an object;
   detecting, with the sensor device, a distance relative to the object; and
   projecting a light marker onto a ground near the object, the light marker being round, polygonal, and/or linear,
      wherein, if the light marker is round or polygonal, the light marker is projected to indicate a minimum distance to be maintained around the object when driving past, and
      wherein, if the light marker is linear, the light marker is projected to correspond to a minimum distance to be maintained from the object when driving past, the light marker indicating where the motor vehicle can safely reenter a driving lane after passing the object.

10. The method according to claim 9, wherein the light marker is round or polygonal, the light marker being a ring, a frame, or a completely illuminated area.

11. The method according to claim 9, wherein the light marker is round or polygonal, the light marker being a ring or a frame, and the light marker being an off-limits area.

12. The method according to claim 9, wherein the light marker is linear, the light marker representing a lateral path of travel.

13. The method according to claim 9, wherein a projection device of the motor vehicle is configured to project at least one additional piece of information, the at least one additional piece of information being an illuminated display on the ground.

14. The method according to claim 13, wherein the illuminated display is configured to project warning information, the warning information indicating that a prescribed minimum distance cannot be observed when passing the object.

15. The method according to claim 14, wherein the projection device is further configured to project at least partially the at least one additional piece of information in a signal color.

* * * * *